US010784937B2

(12) United States Patent
Park

(10) Patent No.: US 10,784,937 B2
(45) Date of Patent: Sep. 22, 2020

(54) BEAMFORMER INCLUDING SIGNAL DETECTOR FOR COMPENSATING WEIGHTS, WIRELESS TRANSMITTING AND RECEIVING DEVICE INCLUDING BEAMFORMER, AND OPERATING METHOD OF WIRELESS TRANSMITTING AND RECEIVING DEVICE INCLUDING BEAMFORMER

(71) Applicant: RFcore Co., Ltd., Seongnam-si (KR)

(72) Inventor: Kwanyoung Park, Gwangju-si (KR)

(73) Assignee: RFcore Co., Ltd., Seongnam-si (KR)

( * ) Notice: Subject to any disclaimer, the term of this patent is extended or adjusted under 35 U.S.C. 154(b) by 0 days.

(21) Appl. No.: 16/582,992

(22) Filed: Sep. 25, 2019

(65) Prior Publication Data
US 2020/0212976 A1  Jul. 2, 2020

(51) Int. Cl.
*H04B 7/06* (2006.01)
*H04B 1/401* (2015.01)

(52) U.S. Cl.
CPC .......... *H04B 7/0617* (2013.01); *H04B 1/401* (2013.01); *H04B 7/0634* (2013.01)

(58) Field of Classification Search
CPC .................................................. H04B 7/0617
See application file for complete search history.

(56) References Cited

U.S. PATENT DOCUMENTS 5,726,662 A * 3/1998 Hopwood ................ H01Q 3/22
342/372
6,049,307 A   4/2000 Lim
6,175,747 B1 * 1/2001 Tanishima ............... H04B 1/54
455/403

(Continued)

FOREIGN PATENT DOCUMENTS

KR     1999015228 A    3/1999
KR   1020160114978 A   10/2016

OTHER PUBLICATIONS

Ju Yul Lee et al.; "Apparatus and System for Beam Forming of Array Antenna"; Abstract of KR20160114978 (A); Oct. 6, 2016; https://worldwide.espacenet.com.

*Primary Examiner* — Hsinchun Liao
(74) *Attorney, Agent, or Firm* — Andrew D. Fortney; Central California IP Group, P.C.

(57) ABSTRACT

A wireless transmitting and receiving device includes antennas, weight adjusters connected to antennas, respectively, and configured to apply weights to an amplitude and a phase of a signal communicating through the antennas, signal transmitting and detecting units connected to the weight adjusters, respectively, a transmitter and a receiver connected to a first switch, a power distributor configured to connect the first switch to the respective signal transmitting and detecting units through internal wirings, and a compensator configured to the weights of the weight adjusters according to output signals of the signal transmitting and detecting units. Each of the signal transmitting and detecting units is configured to connect a corresponding weight adjuster and a corresponding wiring of the power distributor to each other in a first mode and to output a ratio of a signal, transmitted from the corresponding weight adjuster, and a signal, transmitted from the corresponding wiring of the power distributor, as one of the output signals in a second mode.

16 Claims, 12 Drawing Sheets

(56) References Cited

U.S. PATENT DOCUMENTS 6,373,433 B1\* 4/2002 Espax .................. H01Q 3/2605
342/368
2003/0222818 A1\* 12/2003 Regnier .................. H01Q 3/28
342/383

\* cited by examiner

BEAMFORMER INCLUDING SIGNAL DETECTOR FOR COMPENSATING WEIGHTS, WIRELESS TRANSMITTING AND RECEIVING DEVICE INCLUDING BEAMFORMER, AND OPERATING METHOD OF WIRELESS TRANSMITTING AND RECEIVING DEVICE INCLUDING BEAMFORMER

CROSS-REFERENCE TO RELATED APPLICATIONS

A claim for priority under 35 U.S.C. § 119 is made to Korean Patent Application No. 10-2019-0000084 filed on Jan. 2, 2019, in the Korean Intellectual Property Office, the entire content of which is hereby incorporated by reference.

TECHNICAL FIELD

The present disclosure relates to wireless devices and, more particularly, to a beamformer including a signal detector configured to internally adjust weights to align phases of signals, a wireless transmitting and receiving device including a beamformer, and an operating method of the wireless transmitting and receiving device including a beamformer.

BACKGROUND

A wireless transmitting and receiving device transmits and receives information using a radio-frequency (RF) signal. Some wireless transmitting and receiving devices may transmit or receive a signal using two or more antennas.

For example, a phased-array radar may search and track objects using antennas arranged in an array. A meteorological radar may collect various types of information in the air using antennas arranged in an array.

Not only radar but also communication devices for the purpose of information exchange may provide various functions such as improving communication quality or providing directivity using two or more antennas.

When two or more antennas are used, phases of signals communicating at the antennas may be changed. For example, when signals are transmitted through two or more antennas, phases of the signals may be changed due to differences in characteristics of paths through which the signal is transmitted from a transmitter to the two or more antennas. For the same reason, the phase of the signals transmitted from the antennas to the receiver may be changed.

SUMMARY

Example embodiments of the present disclosure provide a beamformer including a signal detector configured to internally adjust weights to align phases of signals, a wireless transmitting and receiving device including a beamformer, and an operating method of the wireless transmitting and receiving device including a beamformer.

An aspect of the present disclosure is to provide a wireless transmitting and receiving device. The wireless transmitting and receiving device includes antennas, weight adjusters connected to antennas, respectively, and configured to apply weights to an amplitude and a phase of a signal communicating through the antennas, signal transmitting and detecting units connected to the weight adjusters, respectively, a transmitter and a receiver connected to a first switch, a power distributor configured to connect the first switch to the respective signal transmitting and detecting units through internal wirings, and a compensator configured to adjust the weights of the weight adjusters respectively according to output signals of the signal transmitting and detecting units. Each of the signal transmitting and detecting units is configured to connect a corresponding weight adjuster and a corresponding wiring of the power distributor to each other in a first mode and to output a ratio of a first signal, transmitted from the corresponding weight adjuster, and a second signal, transmitted from the corresponding wiring of the power distributor, as one of the output signals in a second mode.

In example embodiments, the compensator may be configured to control each of the signal transmitting and detecting units in one of the first and second modes.

In example embodiments, each of the signal transmitting and detecting units may include a second switch connected to the corresponding weight adjuster, a third switch connected to the corresponding wiring of the power distributor, and a phase and gain detector configured to output a ratio of an amplitude and/or a phase difference of a signal, transmitted from the second switch, and a signal, transmitted from the third switch, as the one of the output signals. In the first mode, the second switch may connect the corresponding weight adjuster to the third switch and the third switch connects the corresponding wiring of the power distributor to the second switch. In the second mode, the second switch may connect the corresponding weight adjuster to the phase and gain detector and the third switch connects the corresponding wiring of the power distributor to the phase and gain detector.

In example embodiments, the compensator may be configured to detect signals, transmitted from reference antennas to neighboring antennas among the antennas, to adjust weights associated with the reference antenna.

In example embodiments, the antennas may be arranged in a matrix of rows and columns, the reference antennas may be disposed closest in a same row or a same column, and the neighboring antennas may be disposed closest to the reference antennas in adjacent row of the same row or an adjacent column of the same column.

In example embodiments, the compensator may control a first phase and gain detector, associated with a first reference antenna among the antennas, in the first mode and may control a second phase and gain detector, associated with a first neighboring antenna adjacent to the first reference antenna, and a third phase and gain detector, associated with a second neighboring antenna adjacent to the first reference antenna, in the second mode.

In example embodiments, the compensator may deactivate phase and gain detectors corresponding to remaining antennas except for the first reference antenna, the first neighboring antenna, and the second neighboring antenna among the antennas.

In example embodiments, when the transmitter transmits a third signal through the first switch, the compensator may obtain a first output signal from the second phase and gain detector and a second output signal from the third phase and gain detector.

In example embodiments, after obtaining the first output signal and the second output signal, the compensator may control a fourth phase and gain detector, associated with a second reference antenna among the antennas, in the first mode and may control the second phase and gain detector and the third phase and gain detector in the second mode.

In example embodiments, when the transmitter transmits a fourth signal through the first switch, the compensator may obtain a third output signal from the second phase and gain detector and a fourth output signal from the third phase and gain detector.

In example embodiments, the compensator may adjust a weight, associated with one of the first and second reference antennas, depending on a result value obtained by multiplying a ratio of the first output signal and the second output signal by a ratio of the third output signal and the fourth output signal.

In example embodiments, the compensator may be configured to detect signals, transmitted through a target antenna, a reference antenna, and an intermediate antenna between the target antenna and the reference antenna, from among the antenna, and to adjust a weight associated with the target antenna.

In example embodiments, the compensator may control a first phase and gain detector, associated with the target antenna, in the first mode and may control a second phase and gain detector, associated with the intermediate antenna, in the second mode. When the transmitter transmits a third signal through the first switch, the compensator may obtain a first output signal of the second phase and gain detector.

In example embodiments, after obtaining the first output signal, the compensator may control a third phase and gain detector, associated with the reference antenna, in the first mode and may control a second phase and gain detector, associated with the intermediate antenna, in the second mode. When the transmitter transmits a fourth signal through the first switch, the compensator may obtain a second output signal of the second phase and gain detector.

In example embodiments, the compensator may adjust a weight, associated with the target antenna, based on a ratio of the first output signal and the second output signal.

In example embodiments, the compensator may control a first phase and gain detector, associated with the intermediate antenna, in the first mode and may control a second phase and gain detector, associated with the target antenna, and a third phase and gain detector, associated with the reference antenna, in the second mode. When the transmitter transmits a third signal through the first switch, the compensator may obtain a first output signal of the second phase and gain detector and a second output signal of the third phase and gain detector.

Another aspect of the present disclosure is to provide an operating method of a wireless transmitting and receiving device including weight adjusters and phase and gain detectors corresponding to the weight adjusters. The operating method includes detecting first phase differences and first gains of first signals, transmitted from reference antennas to neighboring antennas, from among antennas corresponding to the weight adjusters, in the phase and gain detectors, adjusting weights of weight adjusters, associated with the reference antennas, depending on the first phase differences and the first gains, detecting second phase differences and second gains of second signals transmitted through a reference antenna among the reference antenna, a target antenna, and an intermediate antenna between the single reference antenna and the target antenna, and adjusting a weight of a weight adjuster, associated with the target antenna, depending on the second phases and the second gains.

In example embodiments, the operating method may further include including the target antenna in the reference antennas after adjusting the weight of the target antenna, selecting a new target antenna among the antennas, and re-performing the detecting second phase differences and second gains and adjusting a weight on the new target antenna.

In example embodiments, the including the target antenna in the reference antennas, the selecting a new target antenna among the antennas, and the detecting second phases and second gains may be repeatedly performed until weights of the antennas are all adjusted.

In example embodiments, phases of signals communicating through the antenna may be aligned as the weights of the antennas are all adjusted.

An aspect of the present disclosure is to provide a beamformer. The beamformer includes weight adjusters connected to antenna nodes and configured to apply weights to an amplitude and a phase of a signal communicating through the antenna nodes, the antenna node being configured to be connected to external antennas, signal transmitting and detecting units connected to the weight adjusters, respectively, and a power distributor connected to a radio-frequency (RF) node and configured to distribute a signal transmitted from the wireless signal node and to transmit the distributed signal to the respective signal transmitting and detecting units, the RF node being configured to be connected to a RF source. Each of the signal transmitting and detecting units is configured to connect a corresponding weight adjuster and the wireless signal node to each other in a first mode and to output a ratio of a first signal, transmitted from the corresponding weight adjuster, and a second signal, transmitted from the wireless signal node, as one of the output signals.

In example embodiments, the weight adjusters may be configured to adjust weights depending on control signals received from an external device, respectively.

BRIEF DESCRIPTION OF THE DRAWINGS

The present disclosure will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the present disclosure.

DETAILED DESCRIPTION

Example embodiments of the present disclosure will now be described below more fully with reference to accompanying drawings. The present disclosure may, however, be embodied in different forms and should not be constructed as limited to the embodiments set forth herein. Rather, these embodiments are provided so that this disclosure will be thorough and complete, and will fully convey the scope of the present invention to those skilled in the art.

Figure 1:
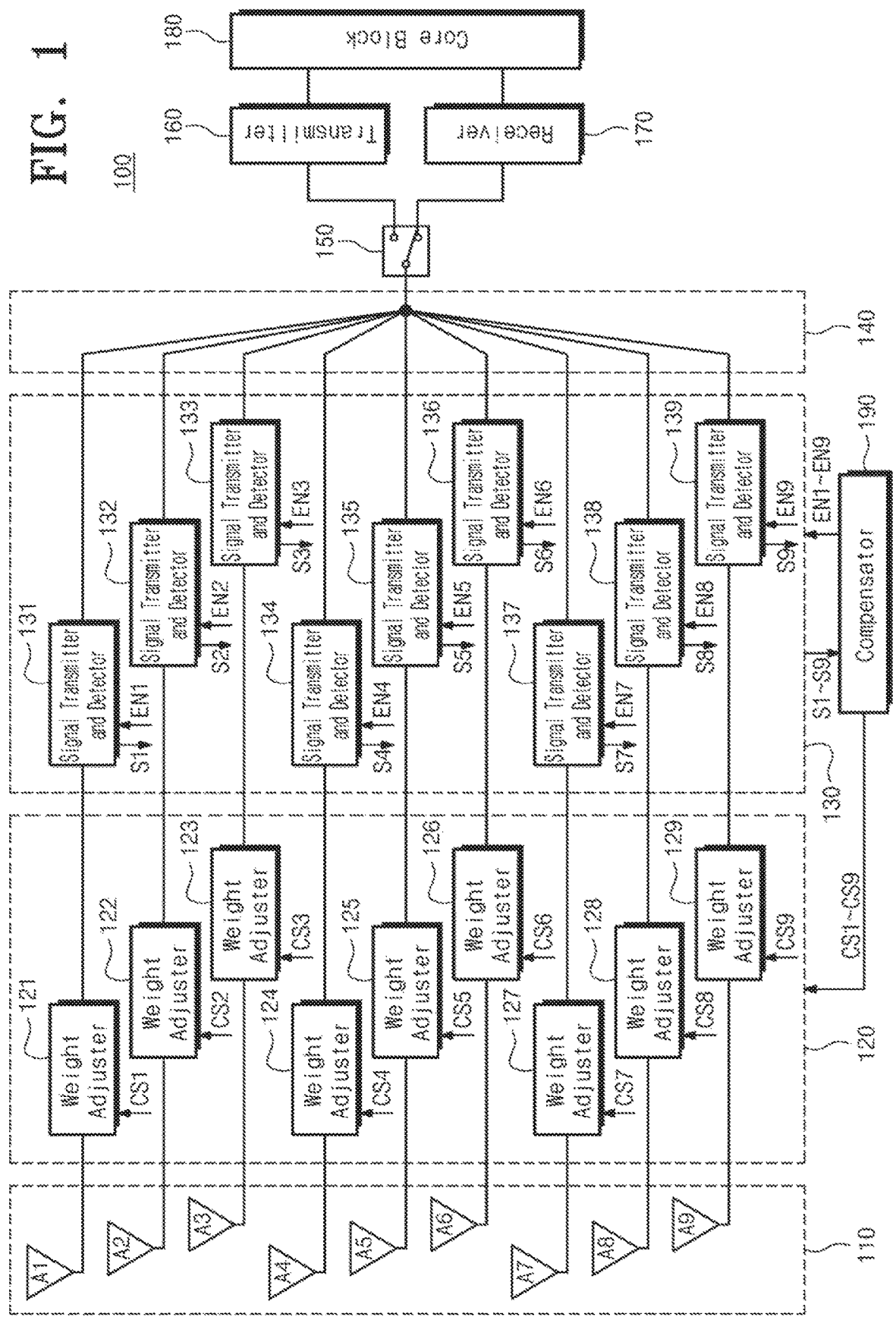
FIG. 1 is a block diagram of a wireless transmitting and receiving device according to an example embodiment of the present disclosure.

FIG. 1 is a block diagram of a wireless transmitting and receiving device according to an example embodiment of the present disclosure. Referring to FIG. 1, a wireless transmitting and receiving device 100 includes an antenna block 110, a weight block 120, a detection block 130, a power distribution block 140, a switch 150, a transmitter 160, a receiver 170, a core block 180, and a compensator 190.

The antenna block 110 includes first to ninth antennas A1 to A9. The first to ninth antennas A1 to A9 may be arranged in a matrix of rows and columns. In the same row, the antennas may be arranged at equal intervals. In the same column, the antennas may be arranged at equal intervals.

As an example, the first to ninth antennas A1 to A9 may include various antennas such as a rod antenna, a roof antenna, a patch antenna, and the like, and are not limited to a specific antenna.

The weight block 120 includes first to ninth weight adjusters 121 to 129. The first to ninth weight adjusters 121 to 129 are connected to the first to ninth antennas A1 to A9, respectively. The first to ninth weight adjusters 121 to 129 may apply weights to signals transmitted to the first to ninth antennas A1 to A9 or signals transmitted from the first to ninth antennas A1 to A9, respectively.

The weights applied by the first to ninth weight adjusters 121 to 129 may adjust amplitudes and/or phases of signals. The first to ninth weight adjusters 121 to 129 may receive the first to ninth control signals CS1 to CS9 from the compensator 190, respectively. The first to ninth weight adjusters 121 to 129 may adjust the weights in response to the first to ninth control signals CS1 to CS9, respectively.

The detection block 130 includes first to ninth signal transmitting and detecting units 131 to 139. The first to ninth signal transmitting and detecting units 131 to 139 may be connected to the first to ninth weight adjusters 121 to 129, respectively. The first to ninth signal transmitting and detecting units 131 to 139 may receive the first to ninth mode signals EN1 to EN9 from the compensator 190, respectively.

In response to the first to ninth mode signals EN1 through EN9, each of the first to ninth signal transmitting and detecting units 131 to 139 may operate either in a first mode or in a second mode. In the first mode, each of the first to ninth signal transmitting and detecting units 131 to 139 may connect a corresponding weight adjuster, from among the first to ninth weight adjusters 121 to 129, and the switch 150 to each other.

In the second mode, each of the first to ninth signal transmitting and detecting units 131 to 139 may detect a ratio (for example, an amplitude ratio) or a difference (for example, a phase difference) of a signal transmitted from the corresponding weight adjuster and the signal transmitted from the switch 150. Each of the first to ninth signal transmitting and detecting units 131 to 139 may output detected results as a corresponding output signal among the first to ninth output signals S1 to S9.

The power distribution block 140 may distribute signals, transmitted from the switch 150, to the first to ninth signal transmitting and detecting units 131 to 139. For example, the power distribution block 140 may distribute output signal of the switch 150 to nine signals having the same amplitude and the same phase. The power distribution block 140 may transmit the nine signals to the first to ninth signal transmitting and detecting units 131 to 139 through wirings.

As an example, due to positions of the first to ninth signal transmitting and detecting units 131 to 139 and distance differences between the positions of the first to ninth signal transmitting and detecting units 131-139 and the switch 150, lengths of the wirings connecting the switch 150 and the first to ninth signal transmitting and detecting units 131 to 139 may be different from each other. The length differences of the wirings may cause differences in the amplitude and phase of signals.

The switch 150 is commonly connected to the first to ninth signal transmitting and detecting units 131 to 139. The switch 150 may connect the first to ninth signal transmitting and detecting units 131-139 to the transmitter 160 or to the receiver 170. For example, the switch 150 may perform switching under the control of the core block 180.

The transmitter 160 may modulate a baseband signal or an intermediate band signal, transmitted from the core block 180, using a carrier signal and transmit the modulated signal to the switch 150. The receiver 170 may demodulate the signal, transmitted from the switch 150, using the carrier signal to extract a baseband signal or an intermediate band signal. The receiver 170 may transmit the extracted signal to the core block 180.

The core block 180 may generate information to be transmitted through the transmitter 160. The core block 180 may obtain information from the signal received through the receiver 170. The core block 180 may process the obtained information to perform various predetermined operations. The core block 180 may control the switch 150 to select the transmitter 160 when there is a desire to transmit information and to select the receiver 170 when there is a desire to receive information.

The compensator 190 may control a mode of the wireless transmitting and receiving device 100. When the wireless transmitting and receiving device 100 communicates with an external device or collects information of an external environment, the compensator 190 may control the wireless transmitting and receiving device 100 in a first mode (for example, a normal mode). The compensator 190 may control the wireless transmitting and receiving device 100 in a second mode (for example, a compensation mode) when there is a desire to compensate for phase and/or amplitude differences occurring in the wireless transmitting and receiving device 100.

The compensator 190 may provide the first to ninth mode signals EN1 to EN9 to the first to ninth signal transmitting and detecting units 131 to 139, respectively. The compensator 190 may individually control the first to ninth signal transmitting and detecting units 131 to 139 in the first mode or the second mode using the first to ninth mode signals EN1 to EN9.

In the second mode, the first to ninth signal transmitting and detecting units 131 to 139 may transmit the first to ninth output signals S1 to S9 to the compensator 190. For example, among the first to ninth signal transmitting and detecting units 131-139, the signal transmitting and detecting units controlled in the second mode may provide output signals to the compensator 190.

The compensator 190 may receive some of the first to ninth output signals S1 to S9 from signal transmitting and detecting units associated with a compensation operation. The compensator 190 may generate some corresponding control signals, among the first to ninth control signals CS1 to CS9, depending on some of the received output signals. The compensator 190 may adjust weights of some weight adjusters, among the first to ninth weight adjusters 121 to 129, through some control signals.

As an example, nine antennas and components associated with the nine antennas have been illustrated and described in FIG. 1. However, the antennas and the components are merely exemplary. The number of antennas is not limited to nine. The number of weight adjusters is not also limited to nine, and may be equal to the number of antennas. The number of signal transmitting and detecting units may not be limited to nine, and may be equal to the number of antennas.

Figure 2:
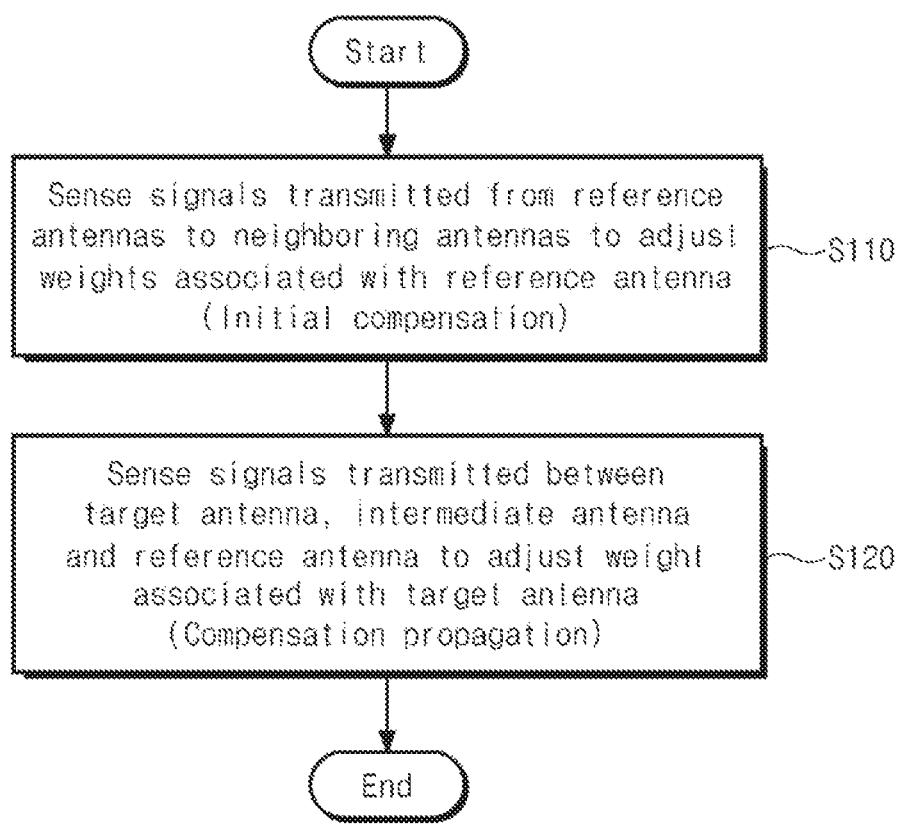
FIG. 2 is a flowchart illustrating a method of compensating phase differences of signals generated in antennas by a wireless transmitting and receiving device according to an example embodiment of the present disclosure.

FIG. 2 is a flowchart illustrating a method of compensating phase differences of signals generated in antennas by the wireless transmitting and receiving device 100 according to an example embodiment of the present disclosure. Referring to FIGS. 1 and 2, in operation S110, the first to ninth signal transmitting and detecting units 131 to 139 may operate in the second mode. The first to ninth signal transmitting and detecting units 131 to 139 may detect signals transmitted from reference antennas, among the first to ninth antennas A1 to A9, to neighboring antenna. The compensator 190 may adjust weights, for example, weights of weight adjusters associated with reference antennas according to a detection result.

In operation S120, the first to ninth signal transmitting and detecting units 131 to 139 may detect signals transmitted between the target antenna, the intermediate antenna, and the reference antenna among the first to ninth antennas A1 to A9. The compensator 190 may adjust a weight of a weight adjuster associated with the target antenna according to a detection result.

Operation S110 may correspond to initial compensation, and operation S120 may correspond to compensation propagation. The initial compensation may adjust weights associated with the reference antennas to compensate phase and/or amplitude differences of signals in two adjacent reference antennas. The compensation propagation may adjust a weight of the target antenna to compensate phase and/or amplitude differences of signals in the reference antenna and the target antenna, where the reference antenna and the target antenna are disposed with the intermediate antenna interposed therebetween.

As an example, the compensation propagation may have less computation than initial compensation and may consume less resources. The initial compensation may have greater computation than the compensation propagation and may consume more resources.

Figure 3:
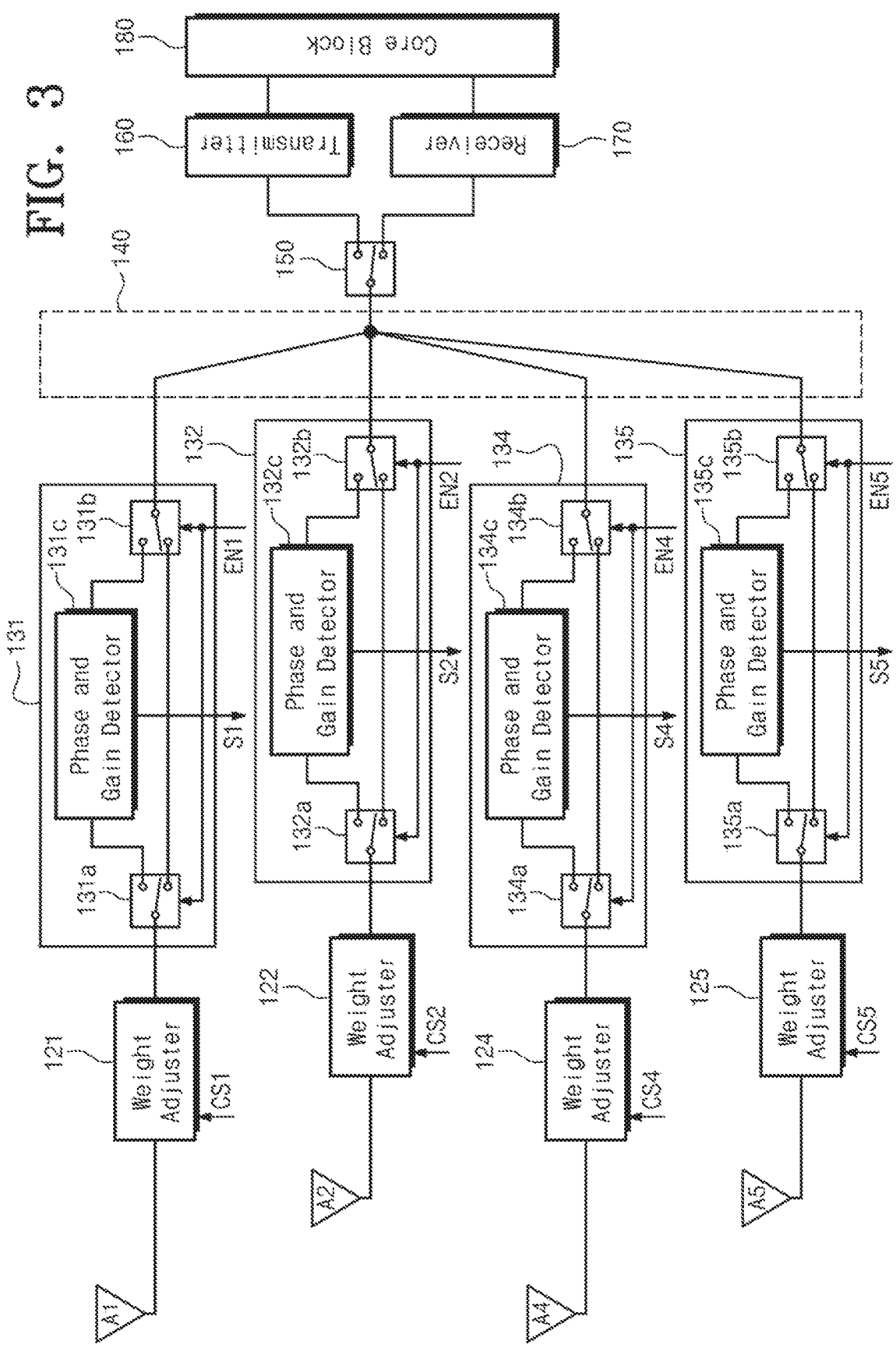
FIG. 3 illustrates examples of signal transmitting and detecting units.

FIG. 3 illustrates examples of signal transmitting and detecting units. As an example, components of the wireless transmitting and receiving device 100 associated with a first antenna A1, a second antenna A2, a fourth antenna A4, and a fifth antenna A5 are illustrated in FIG. 3. Although not illustrated in FIG. 3, signal transmitting and detecting units corresponding to the other antennas A3 and A6 to A9 may have the same configuration as illustrated in FIG. 3.

Referring to FIGS. 1 and 3, the signal transmitting and detecting units 131, 132, 134, or 135 may include a first switch 131a, 132a, 134a, or 135a, a second switch 131b, 132b, 134b, or 135b, and phase and gain detectors 131c, 132c, 134c, or 135c.

The first switch 131a, 132a, 134a or 135a may connect the weight adjuster 121, 122, 124, or 125 to the phase and gain detector 121, 122, 124, or 125 under the control of the mode signal EN1, EN2, EN4, or EN5, or to the second switch 131b, 132b, 134b, or 135b through an internal wiring.

The second switch 131b, 132b, 134b, or 135b may connect the switch 150 to the phase and gain detectors 131c, 132c, 134c, or 134b under the control of the mode signal EN1, EN2, EN4, or EN5, or to the first switch 131a, 132a, 134a, or 135a through the internal wiring.

For example, in the first mode, the weight adjuster 121, 122, 124, or 125 may be connected to the switch 150 through the first switch 131a, 132a, 134a, or 135a, the internal wiring, and the second switch 131b, 132b, 134b, or 135b. That is, in the first mode, the signal transmitting and detecting units 131, 132, 134, or 135 may transfer a signal between the weight adjuster 121, 122, 124, or 125 and the switch 150.

In the second mode, the phase and gain detectors 131c, 132c, 134c, or 135c may receive a signal, transmitted from the weight adjusters 121, 122, 124, or 125, through the first switch 131a, 132a, 134a, or 135a, and may receive a signal, transmitted from the switch 150, through the second switch 131b, 132b, 134b, or 135b.

The phase and gain detectors 131c, 132c, 134c, or 135c may detect an amplitude ratio or a phase differences of received signals and may output a detected result to the compensator 190 as output signal S1, S2, S4, or S5. The amplitude of a signal may experience attenuation or amplification depending on a transmission path of the signal. That is, the amplitude ratio of the signals obtained at the phase and gain detector 131c, 132c, 134c, or 135c may represent a gain and, in the second mode, the signal transmitting and detecting units 131, 132, 134, or 135 may detect the phase difference and the gain of the signals.

Figure 4:
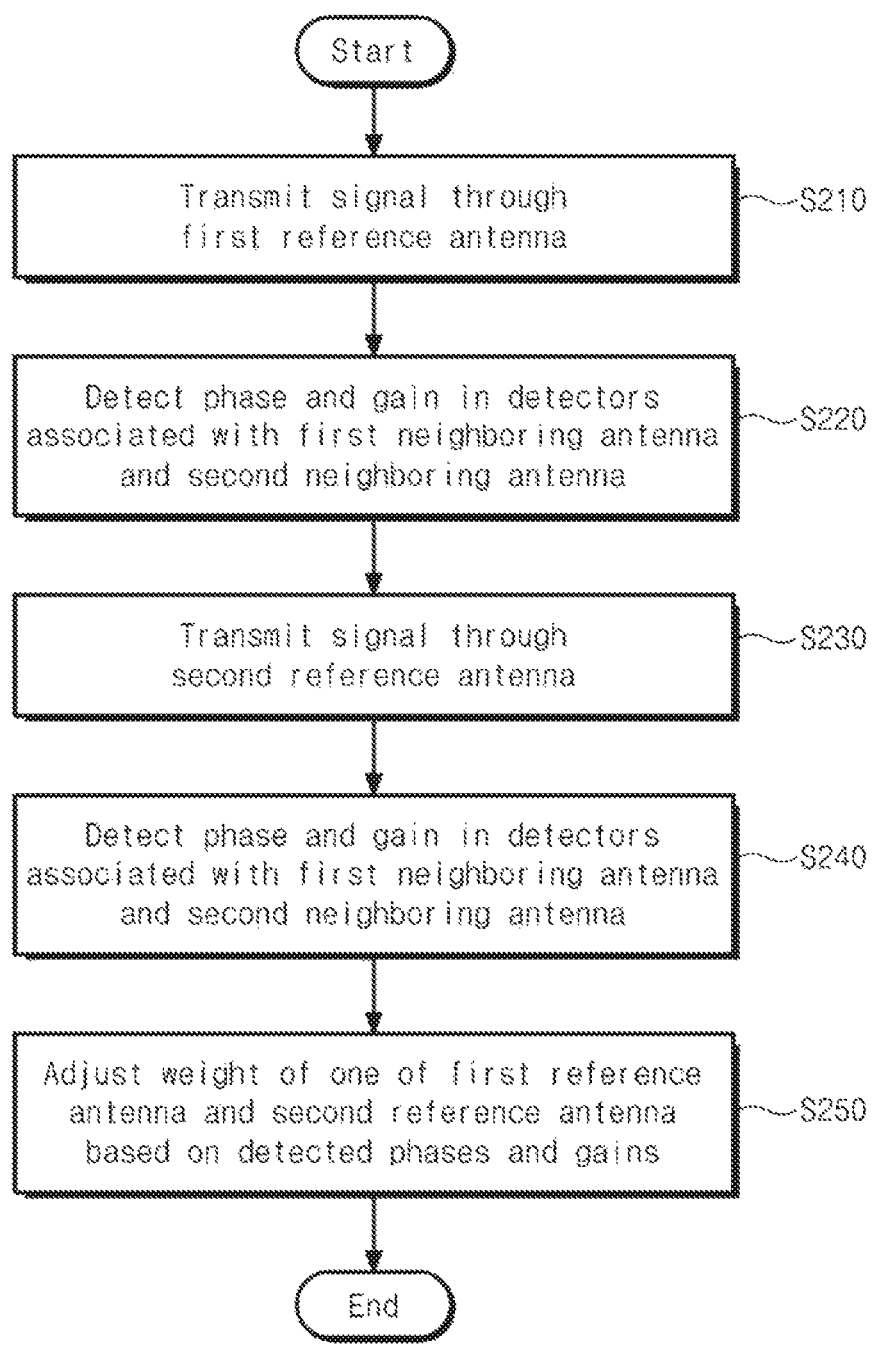
FIG. 4 is a flowchart illustrating an example in which a wireless transmitting and receiving device compensates for weights associated with reference antennas.

FIG. 4 is a flowchart illustrating an example in which a wireless transmitting and receiving device 100 compensates for weights associated with reference antennas (see operation S110 in FIG. 2). Referring to FIGS. 1 and 4, in operation S210, the wireless transmitting and receiving device 100 may transmit a signal through a first reference antenna. The first reference antenna may be selected from the first to ninth antennas A1 to A9.

In operation S220, the wireless transmitting and receiving device 100 may detect a phase difference and a gain in signal transmitting and detecting units associated with a first neighboring antenna and a second neighboring antenna. The first neighboring antenna and the second neighboring antenna may be selected from the first to ninth antennas A1 to A9 and may be adjacent to the first reference antenna.

In operation S230, the wireless transmitting and receiving device 100 may transmit a signal through the second reference antenna. The second reference antenna is selected from the first to ninth antennas A1 to A9 and may be adjacent to the first reference antenna, the first neighboring antenna, and the second neighboring antenna.

In operation S240, the wireless transmitting and receiving device 100 may detect a phase difference and a gain in signal transmitting and detecting units associated with the first and second neighboring antennas.

In operation S250, the wireless transmitting and receiving device 100 may adjust a weight of one of the first reference antenna and the second reference antenna, for example, a weight of a gain and a phase of a weight adjuster, based on detected phases and detected gains.

Figure 5:
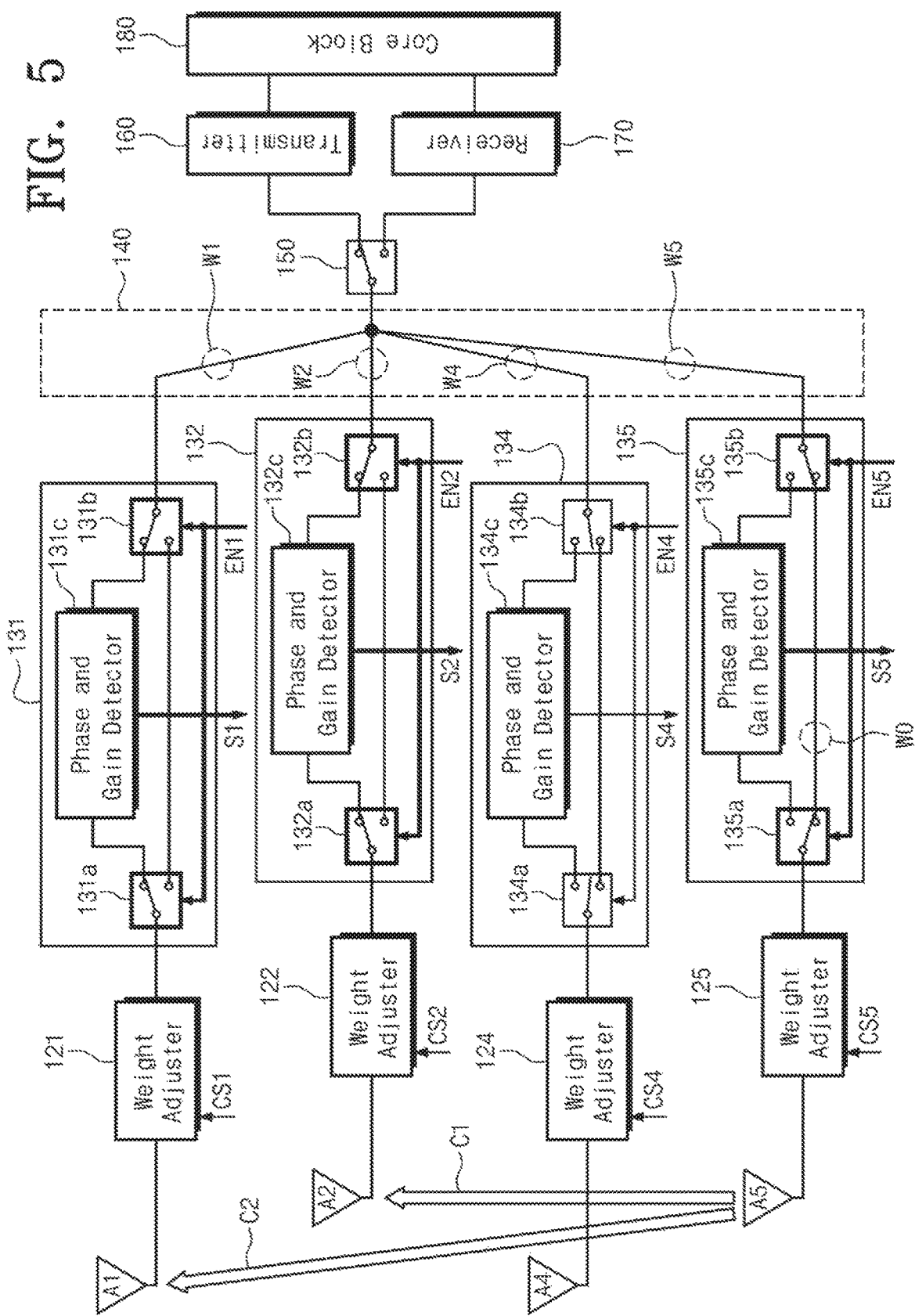
FIG. 5 is an example of transmitting a signal through a first reference antenna to detect a phase difference and a gain in a structure described with reference to FIG. 3.

FIG. 5 is an example of transmitting a signal through a first reference antenna to detect a phase difference and a gain in a structure described with reference to FIG. 3. As an example, a first reference antenna and a second reference antenna may belong to the same row or the same column and may be adjacent to each other. The first reference antenna may be the fifth antenna A5, and the second reference antenna may be the fourth antenna A4.

The first neighboring antenna and the second neighboring antenna belong to the adjacent neighbor row or column to which the first reference antenna and the second reference antenna belong, and are disposed closest to the first reference antenna and the second reference antenna. The first neighboring antenna and the second neighboring antenna may be the first antenna A1 and the second antenna A2, respectively.

Referring to FIGS. 1 and 5, the compensator 190 may control a first switch 135a and a second switch 135b of the fifth signal transmitting and detecting unit 135 through a fifth mode signal EN5 in the first mode. In the fifth signal transmitting and detecting unit 135, the first switch 135a may be connected to the second switch 135b through an internal wiring.

The compensator 190 may control a first switch 131a and a second switch 131b of the first signal transmitting and detecting unit 131 through a first mode signal EN1 in the second mode. In the first signal transmitting and detecting unit 131, the phase and gain detector 131c receives a signal from the first weight adjuster 121 through the first switch 131a and a signal from the switch 150 to the second switch 131b.

The compensator 190 may control a first switch 132a and a second switch 132b of the second signal transmitting and detecting unit 132 through a second mode signal EN2 in the second mode. In the second signal transmitting and detecting unit 132, the phase and gain detector 132c receives a signal from the second weight adjuster 122 through the first switch 132a and a signal from the switch 150 through the second switch 132b.

The compensator 190 may control the fourth signal transmitting and detecting unit 134 through a fourth mode signal EN4 in the second mode and may ignore a fourth output signal S4. Alternatively, the compensator 190 may control the fourth signal transmitting and detecting unit 134 through a fourth mode signal EN4 in a third mode that is an inactive state.

The switch 150 may be connected to the transmitter 160. The core block 180 may transmit a signal Sc for compensation through the transmitter 160. The signal Sc for compensation may have, for example, a relative amplitude of 1 and a relative phase of zero (0). The signal Sc for compensation may be defined by Equation (1).

$$Sc = 1 \cdot e^{0°} = 1 \qquad \text{Equation (1)}$$

While signals are transmitted, they may experience various weights at amplitudes and phases. For example, weights of wirings of the power distribution block 140 may be W1, W2, W4, and W5, different from each other. Weights of internal wirings of the signal transmitting and detecting unit 131, 132, 134, or 135 may be W0, equal to each other.

The signal for compensation may experience a weight corresponding to W5 in amplitude and phase in the power distribution block 140 and a weight corresponding to W0 in an internal wiring of the fifth signal transmitting and detecting unit 135.

A signal, transmitted from the fifth antenna A5, may be received at the second antenna A2. In this case, the signal may experience a weight of C1 corresponding to a coupling coefficient of the fifth antenna A5 and the second antenna A2. A first signal SI1, transmitted from the transmitter 160 and transmitted to the phase and gain detector 132c of the second signal transmitting and detecting unit 132 through the fifth antenna A5 and the second antenna A2, is defined by Equation (2).

$$S/1 = 1 \cdot W5 e^{W5} \cdot W0 e^{W0} \cdot C1 e^{C1} = W5 \cdot W0 \cdot C1 e^{W5+W0+C1} \qquad \text{Equation (2)}$$

A second signal SI2, transmitted from the transmitter 160 and transmitted to the phase and gain detector 132c through the switch 150 and the second switch 132b of the second signal transmitting and detecting unit 132, may be defined by Equation (3).

$$S/2 = 1 \cdot W2 e^{W2} = W3 e^{W2} \qquad \text{Equation (3)}$$

The phase and gain detector 132c of the second signal transmitting and detecting unit 132 may output a ratio of the first signal SI1 and the second signal SI2 as a second output signal S2. The second output signal S2 is defined by equation (4).

$$S2 = \frac{S/1}{S/2} = \frac{W5 \cdot W0 \cdot C1}{W2} e^{W5+W0+C1-W2} \qquad \text{Equation (4)}$$

A signal, transmitted from the fifth antenna A5, may be received at the first antenna A1. In this case, the signal may experience a weight of C2 corresponding to a coupling coefficient of the fifth antenna A5 and the first antenna A1. A third signal SI3, transmitted from the transmitter 160 and transmitted through the fifth antenna A5 and the first antenna A1 to the phase and gain detector 131c of the first signal transmitting and detecting unit 131, may be defined by Equation (5).

$$S/3 = 1 \cdot W5 e^{W5} \cdot W0 e^{W0} \cdot C2 e^{C2} = W5 \cdot W0 \cdot C2 e^{W5+W0+C2} \qquad \text{Equation (5)}$$

The fourth signal SI4, transmitted from the transmitter 160 and transmitted to the phase and gain detector 131c through the switch 150 and the second switch 131b of the first signal transmitting and detecting unit 131, may be defined by Equation (6).

$$S/4 = 1 \cdot W1 e^{W1} = W1 e^{W1} \qquad \text{Equation (6)}$$

The phase and gain detector 131c of the first signal transmitting and detecting unit 131 may output a ratio of the third signal SI3 and the fourth signal SI4 as a first output signal S1. The first output signal S1 is defined by Equation (7).

$$S1 = \frac{S/3}{S/4} = \frac{W5 \cdot W0 \cdot C2}{W1} e^{W5+W0+C2-W1} \quad \text{Equation (7)}$$

The compensator 190 may divide the second output signal S2 of the second antenna A2 (for example, a neighboring antenna) having the weight of C1, closest to the fifth antenna A5 (for example, a reference antenna) by a first output signal S1 of the first antenna A1 (for example, a neighboring antenna) disposed diagonally to the fifth antenna A5. A result of the division indicates an influence eff1 transmitted from the fifth antenna A5 to the second antenna A2 and the first antenna A1, and may be defined by Equation (8).

$$eff1 = \frac{\frac{W5 \cdot W0 \cdot C1}{W2} e^{W5+W0+C1-W2}}{\frac{W5 \cdot W0 \cdot C2}{W1} e^{W5+W0+C2-W1}} = \frac{C1 \cdot W1}{C2 \cdot W2} e^{C1+W1-C2-W2} \quad \text{Equation (8)}$$

Figure 6:
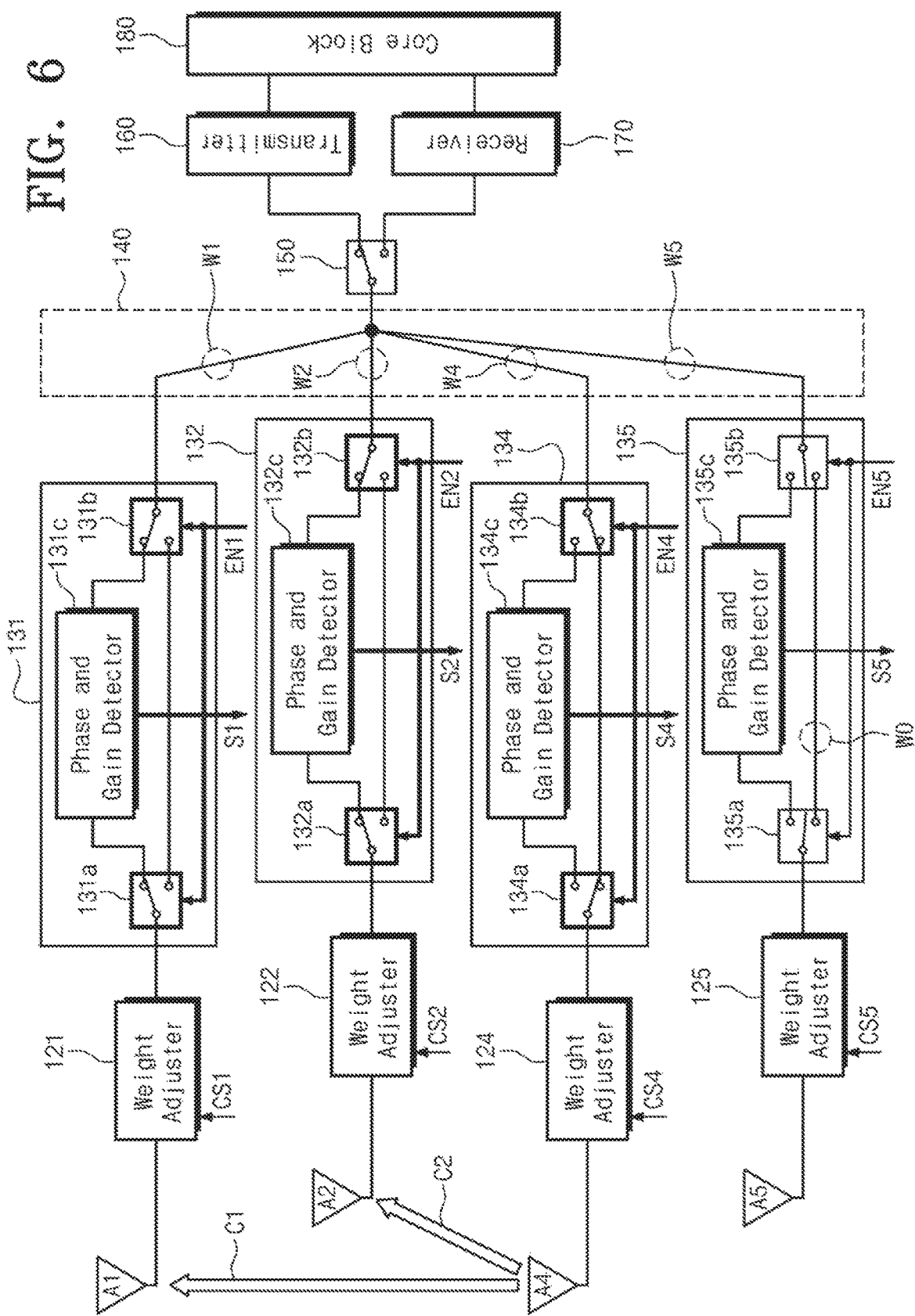
FIG. 6 illustrates an example of transmitting a signal through a second reference antenna to detect a phase difference and a gain in a structure described with reference to FIG. 3.

FIG. 6 illustrates an example of transmitting a signal through a second reference antenna to detect a phase difference and a gain in the structure described with reference to FIG. 3. As described with reference to FIG. 5, the second reference antenna may be the fourth antenna A4. The first neighboring antenna and the second neighboring antenna may be the first antenna A1 and the second antenna A2, respectively.

Referring to FIGS. 1 and 6, the compensator 190 may control a first switch 134a and a second switch 134b of the fourth signal transmitting and detecting unit 134 through a fourth mode signal EN4 in the first mode. In the fourth signal transmitting and detecting unit 134, the first switch 134a may be connected to the second switch 134b through an internal wiring.

The compensator 190 may control the first switch 131a and the second switch 131b of the first signal transmitting and detecting unit 131 through the first mode signal EN1 in the second mode. In the first signal transmitting and detecting unit 131, the phase and gain detector 131c may receive a signal from the first weight adjuster 121 through the first switch 131a and a signal from the switch 150 to the second switch 131b.

The compensator 190 may control the first switch 132a and the second switch 132b of the second signal transmitting and detecting unit 132 through the second mode signal EN2 in the second mode. The phase and gain detector 132c may receive a signal from the second weight adjuster 122 through the first switch 132a and a signal from the switch 150 through the second switch 132b.

The compensator 190 may control the fifth signal transmitting and detecting unit 135 through the fifth mode signal EN5 in the second mode and may ignore the fifth output signal S5. Alternatively, the compensator 190 may control the fifth signal transmitting and detecting unit 135 through the fifth mode signal EN5 in a third mode that is an inactive state.

The switch 150 may be connected to the transmitter 160. The core block 180 may transmit a signal Sc for compensation through the transmitter 160. The signal Sc for compensation may be the same as defined in Equation (1).

The signal for compensation experiences a weight corresponding to W4 in amplitude and phase in power distribution block 140 and may experience a weight corresponding to W0 in the internal wiring of the fourth transmitting and detecting unit 135 while transferring from switch 150 to fourth signal transmitting and detecting unit 134.

A signal, transmitted from the fourth antenna A4, may be received at the first antenna A1. In this case, the signal may experience a weight of C1 corresponding to a coupling coefficient of the fourth antenna A4 and the first antenna A1. The fifth signal SI5, transmitted from the transmitter 160 and transmitted through the fourth antenna A4 and the first antenna A1 to the phase and gain detector 131c of the first signal transmitting and detecting units 131, may be defined by Equation (9).

$$S/5 = 1 \cdot W4 e^{W4} \cdot W0 e^{W0} \cdot C1 e^{C1} = W4 \cdot W0 \cdot C1 e^{W4+W0+C1} \quad \text{Equation (9)}$$

A sixth signal SI6, transmitted from the transmitter 160 and transmitted to the phase and gain detector 131c through the switch 150 and the second switch 131b of the first signal transmitting and detecting unit 131, may be defined by Equation (10).

$$S/6 = 1 \cdot W1 e^{W1} = W1 e^{W1} \quad \text{Equation (10)}$$

The phase and gain detector 131c of the first signal transmitting and detecting unit 131 may output a ratio of the fifth signal SI5 and the sixth signal SI6 as a first output signal S1. The first output signal S1 is defined by Equation (11).

$$S1 = \frac{S/5}{S/6} = \frac{W4 \cdot W0 \cdot C1}{W1} e^{W4+W0+C1-W1} \quad \text{Equation (11)}$$

A signal, transmitted from the fourth antenna A4, may be received at the second antenna A2. In this case, the signal may experience a weight of C2 corresponding to a coupling coefficient of the fourth antenna A4 and the second antenna A2. A seventh signal SI7, transmitted from the transmitter 160 and transmitted to the phase and gain detector 132c of the second signal transmitting and detecting unit 132 through the fourth antenna A4 and the second antenna A2, may be defined by Equation (12).

$$S/7 = 1 \cdot W4 e^{W4} \cdot W0 e^{W0} \cdot C2 e^{C2} = W4 \cdot W0 \cdot C2 e^{W4+W0+C2} \quad \text{Equation (12)}$$

An eighth signal SI8, transmitted from the transmitter 160 and transmitted to the phase and gain detector 132c through the switch 150 and the second switch 132b of the second signal transmitting and detecting unit 132, may be defined by Equation (13).

$$S/8 = 1 \cdot W2 e^{W2} = W2 e^{W2} \quad \text{Equation (13)}$$

The phase and gain detector 132c of the second signal transmitting and detecting unit 132 may output a ratio of the seventh signal SI7 and the eighth signal SI8 as a second output signal S2. The second output signal S2 may be defined by Equation (14).

$$S2 = \frac{S/7}{S/8} = \frac{W4 \cdot W0 \cdot C2}{W2} e^{W4+W0+C2-W2} \quad \text{Equation (14)}$$

Similarly to Equation (8), the compensator 190 may divide the second output signal S2, obtained in association with the second antenna A2, by a first output signal S1 obtained in association with the first antenna A1. A result of the division indicates an influence eff2, transmitted from the fourth antenna A4 to the first antenna A1 and the second antenna A2, may be defined by Equation (15).

$$eff2 = \frac{\frac{W4 \cdot W0 \cdot C2}{W2}e^{W4+W0+C2-W2}}{\frac{W4 \cdot W0 \cdot C1}{W1}e^{W4+W0+C1-W1}} = \frac{C2 \cdot W1}{C1 \cdot W2}e^{C2+W1-C1-W2} \quad \text{Equation (15)}$$

The compensator 190 may multiply the first influence eff1, calculated through Equation (8) with reference to FIG. 5, and the second effect eff2 calculated through Equation (15) with reference to FIG. 6. A result of the multiplication is shown in Equation (16).

$$eff1 \cdot eff2 = \frac{C1 \cdot W1}{C2 \cdot W2}e^{C1+W1-C2-W2} \cdot \frac{C2 \cdot W1}{C1 \cdot W2}e^{C2+W1-C1-w2} = \frac{W1^2}{W2^2}e^{2w1-2w2} \quad \text{Equation (16)}$$

Referring to Equation (16), the compensator 190 may detect a gain and a phase of the weight of W1 and the weight of W2. A weight of the fourth weight adjuster 124 associated with the fourth antenna A4 or a weight of the fifth weight adjuster 125 associated with the fifth antenna A5 may be adjusted depending on a result of the detection. Thus, amplitudes of the signals may become equal to each other or phases thereof may be aligned at the fifth antenna A4 and the fifth antenna A5.

Figure 7:
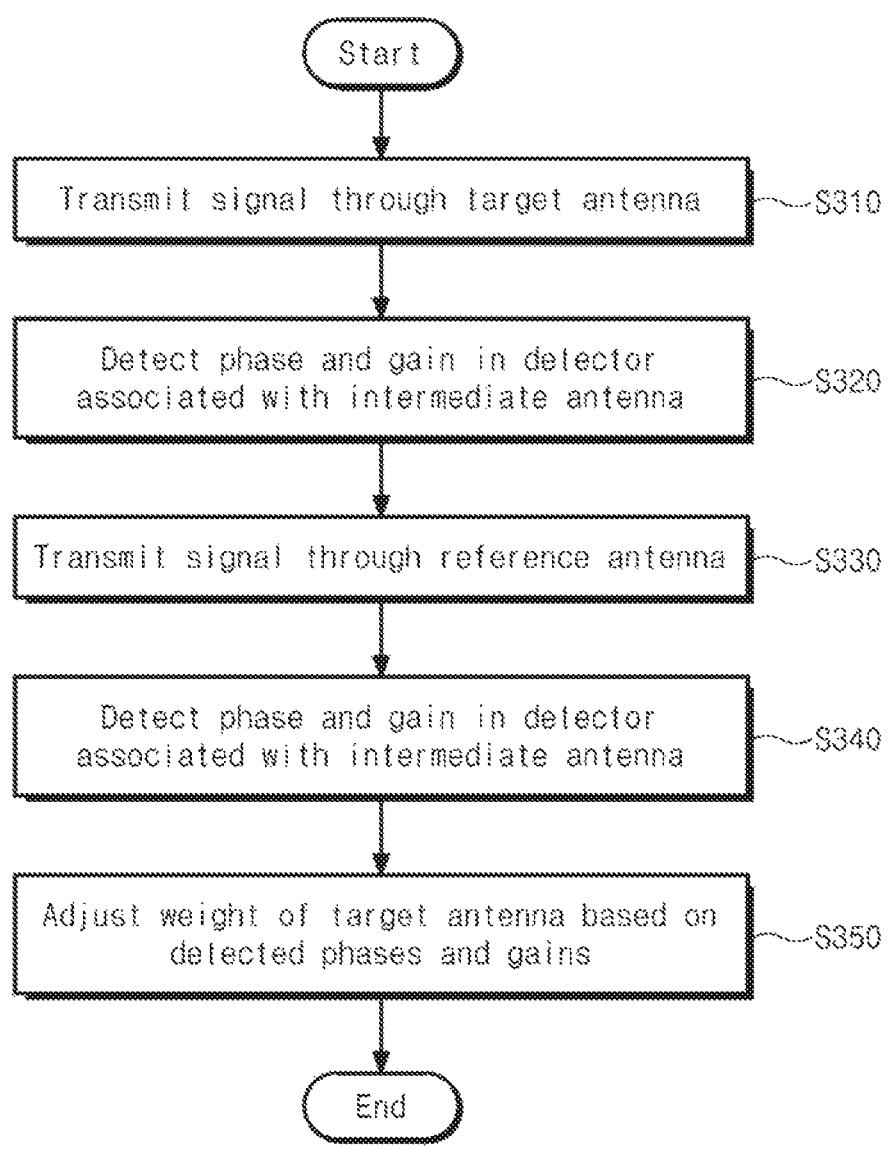
FIG. 7 is a flowchart illustrating an example in which a wireless transmitting and receiving device compensates for a weight in association with a reference antenna, an intermediate antenna, and a target antenna.

FIG. 7 is a flowchart illustrating an example in which the wireless transmitting and receiving device 100 compensates for a weight in association with a reference antenna, an intermediate antenna, and a target antenna (see S120 in FIG. 2). Referring to FIGS. 1 and 7, in operation S310, the wireless transmitting and receiving device 100 may transmit a signal through a target antenna. The target antenna may be selected from the first to ninth antennas A1 to A9.

In step S320, the wireless transmitting and receiving device 100 may detect a phase difference and a gain in the signal transmitting and detecting unit associated with an intermediate antenna. The intermediate antenna is selected from the first to ninth antennas A1 to A9, and may be adjacent to the reference antenna.

In step S330, the wireless transmitting and receiving device 100 may transmit a signal through the reference antenna. The reference antenna is selected from the first to ninth antennas A1 to A9, and may be disposed with the intermediate antenna between the reference antenna and a target antenna. A weight adjuster of the reference antenna may have a weight compensated by the compensator 190.

In step S340, the wireless transmitting and receiving device 100 may detect a phase difference and a gain in the signal transmitting and detecting unit associated with the intermediate antenna. In step S350, the wireless transmitting and receiving device 100 may adjust a weight of the target antenna, for example, a gain and a phase of the weight adjuster, based on detected phases and gains.

Figure 8:
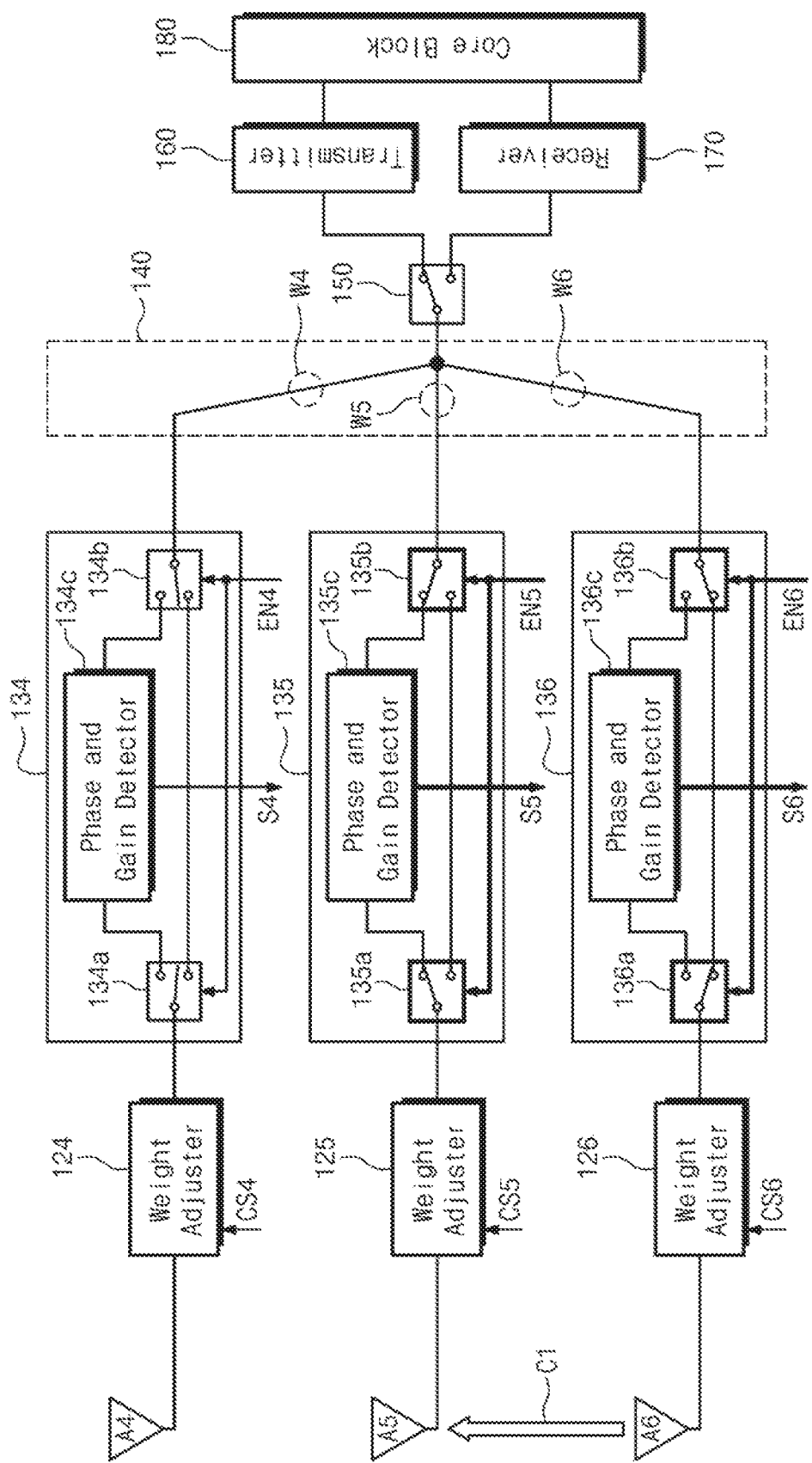
FIG. 8 is an example of transmitting a signal from a target antenna for compensation in association with fourth to sixth antennas.

FIG. 8 is an example of transmitting a signal from a target antenna for compensation in association with the fourth to sixth antennas A4 to A6. For example, as described with reference to FIGS. 4 to 6, it will be assumed that the fourth weight adjuster 124 and the fifth weight adjuster 125 of the fourth antenna A4 and the fifth antenna A5 have compensated weights.

Among the first to ninth antennas A1 to A9, an object antenna to compensate a weight is selected as a target antenna. The target antenna should be disposed adjacent to the reference antenna with a single antenna interposed therebetween. Among the first to ninth antennas A1 to A9, an antenna having a compensated weight is selected as a reference antenna. An antenna between the reference antenna and the target antenna may be involved in compensation as an intermediate antenna.

The reference antenna, the target antenna, and the intermediate antenna may belong to the same row or the same column. For example, the fourth antenna A4 may be a reference antenna, the sixth antenna A6 may be a target antenna, and the fifth antenna A5 may be an intermediate antenna. The intermediate antenna may have a compensated weight. However, it is all right that the intermediate antenna has an uncompensated weight.

Referring to FIGS. 1 and 8, the compensator 190 may control the sixth signal transmitting and detecting unit 136 of the sixth antenna A6, which is the target antenna, in the first mode. The compensator 190 may control the fifth signal transmitting and detecting unit 135 of the fifth antenna A5, which is the intermediate antenna, in the second mode.

As described with reference to Equations (2) and (9), a ninth signal SI9, transmitted from the transmitter 160 to the phase and gain detector 135c of the fifth signal transmitting and detecting unit 135 through the sixth antenna A6 and the fifth antenna A5, may be defined by Equation (17).

$$SI9 = 1 \cdot W6e^{W6} \cdot W0e^{W0} \cdot C1e^{C1} = W6 \cdot W0 \cdot C1e^{W6+W0+C1} \quad \text{Equation (17)}$$

As described with reference to Equations (3) and (10), a tenth signal SI10, transmitted from the transmitter 160 to the phase and gain detector 135c through the switch 150 and the second switch 135b of the fifth signal transmitting and detecting unit 135, may be defined by Equation (18).

$$SI10 = 1 \cdot W5e^{W5} = W5e^{W5} \quad \text{Equation (18)}$$

The phase and gain detector 135c of the fifth signal transmitting and detecting unit 135 may output a ratio of a ninth signal SI9 and a tenth signal SI10 as a fifth output signal S5. The fifth signal S5 is defined by Equation (19).

$$S5 = \frac{SI9}{SI10} = \frac{W6 \cdot W0 \cdot C1}{W5}e^{W6+W0+C1-W5} \quad \text{Equation (19)}$$

Figure 9:
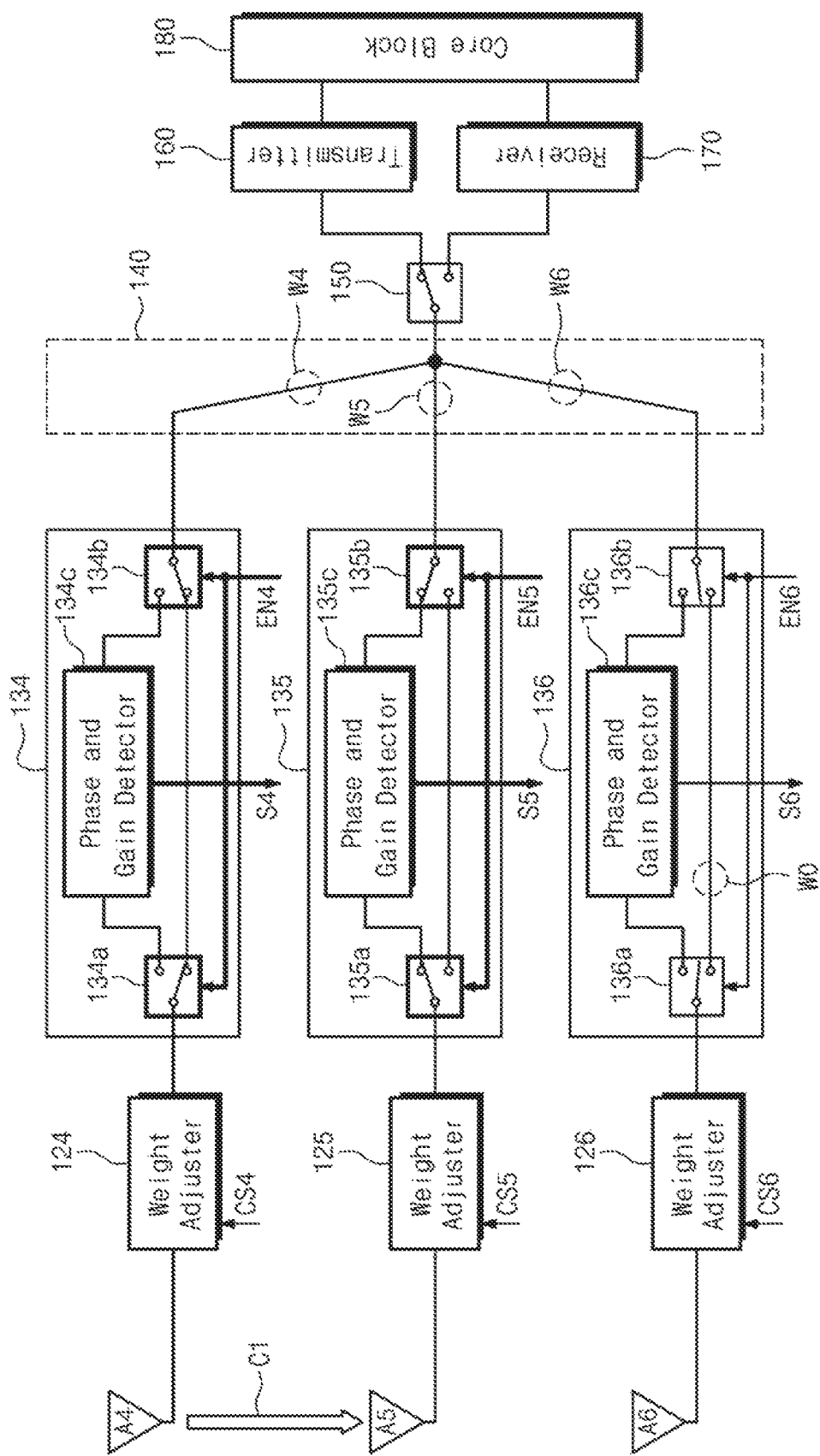
FIG. 9 illustrates an example of transmitting a signal from a reference antenna for compensation in association with fourth to sixth antennas.

FIG. 9 illustrates an example of transmitting a signal from a reference antenna for compensation in association with the fourth to sixth antennas A4 to A6. Referring to FIGS. 1 and 9, the compensator 190 may control the fourth signal transmitting and detecting unit 134 of the fourth antenna A4, which is a reference antenna, in the first mode and may control the fifth signal transfer and detector 135 of the fifth antenna A5, which is an intermediate antenna, in the second mode.

As described with reference to Equations (2) and (9), an eleventh signal SI11, transmitted from the transmitter 160 to the phase and gain detector 135c of the fifth signal transmitting and detecting unit 135 through the fourth antenna A4 and the fifth antenna A5, may be defined by Equation (20).

$$S/11 =$$
$$1 \cdot W4e^{W4} \cdot W0e^{W0} \cdot C1e^{C1} = W4 \cdot W0 \cdot C1e^{W4+W0+C1}$$

Equation (20)

As described with reference to Equations (3) and (10), the tenth signal SI10, transmitted from the transmitter 160 to the phase and gain detector 135c through the switch 150 and the second switch 135b of the fifth signal transmitting and detecting unit 135, may be defined by Equation (18).

The phase and gain detector 135c of the fifth signal transmitting and detecting unit 135 may output a ratio of the eleventh signal SI11 and the tenth signal SI10 to a fifth output signal S5. The fifth signal S5 is defined by Equation (21).

$$S5 = \frac{S/11}{S/10} = \frac{W4 \cdot W0 \cdot C1}{W5} e^{W4+W0+C1-W5}$$

Equation (21)

The compensator 190 may calculate a ratio of the fifth output signals S5 (represented by Equation (19) and Equation (21)) output twice. For example, Equation (21) showing an influence of the fourth antenna A4, which is the reference antenna, on the fifth antenna A5, which is an intermediate antenna, may be divided by Equation (19) showing an influence of the sixth antenna, which a target antenna, on the fifth antenna A5 which is an intermediate antenna. A result of the division is a compensation coefficient COMP and is expressed as Equation (22).

$$COMP = \frac{\frac{W4 \cdot W0 \cdot C1}{W5} e^{W4+W0+C1-W5}}{\frac{W6 \cdot W0 \cdot C1}{W5} e^{W6+W0+C1-W5}} = \frac{W4}{W6} e^{W4-W6}$$

Equation (22)

Referring to Equation 22, the compensation coefficient COMP shows a difference between a weight of the sixth antenna A6, which is a target antenna, and a weight of the fourth antenna A4 which is a reference antenna and shows, in detail, an amplitude ratio (that is, gain) and a phase difference. The compensator 190 may adjust the weight of the sixth weight adjuster 126 of the sixth antenna A6, which is a target antenna, according to the compensation coefficient COMP. When the compensation is completed, amplitudes of signals may become equal to each other and phases thereof may be aligned at the fourth antenna A4 and the sixth antenna A6.

Target antennas may sequentially selected at the first to ninth antennas A1 to A9, and the compensation described with reference to FIGS. 7 to 9 may be performed. Accordingly, amplitudes of the signals communicating at the first to ninth antennas A1 to A9 may become equal to each other, and phases thereof may be all aligned in the same manner.

Figure 10:
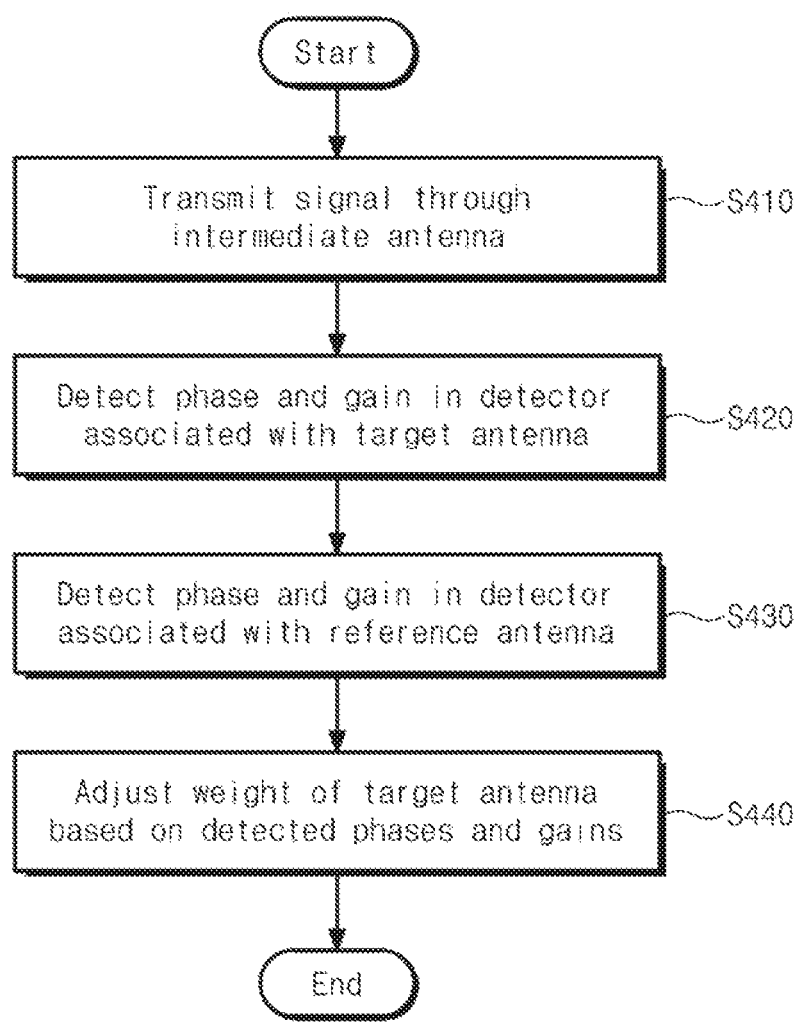
FIG. 10 is a flowchart illustrating another example in which a wireless transmitting and receiving device compensates for a weight in association with a reference antenna, an intermediate antenna, and a target antenna.

FIG. 10 is a flowchart illustrating another example in which the wireless transmitting and receiving device 100 compensates for a weight in association with a reference antenna, an intermediate antenna, and a target antenna (see S120 in FIG. 2). Referring to FIGS. 1 and 10, in operation S410, the wireless transmitting and receiving device 100 may transmit a signal through an intermediate antenna.

In operation S420, the wireless transmitting and receiving device 100 may detect a phase difference and a gain in a signal transmitting and detecting unit associated with a target antenna. In operation S430, the wireless transmitting and receiving device 100 may detect a phase difference and a gain in a signal transmitting and detecting unit associated with a reference antenna. In operation S440, the wireless transmitting and receiving device 100 may adjust a weight of the target antenna, for example, a gain and a phase of the weight adjuster, based on the detected phases and gains.

Figure 11:
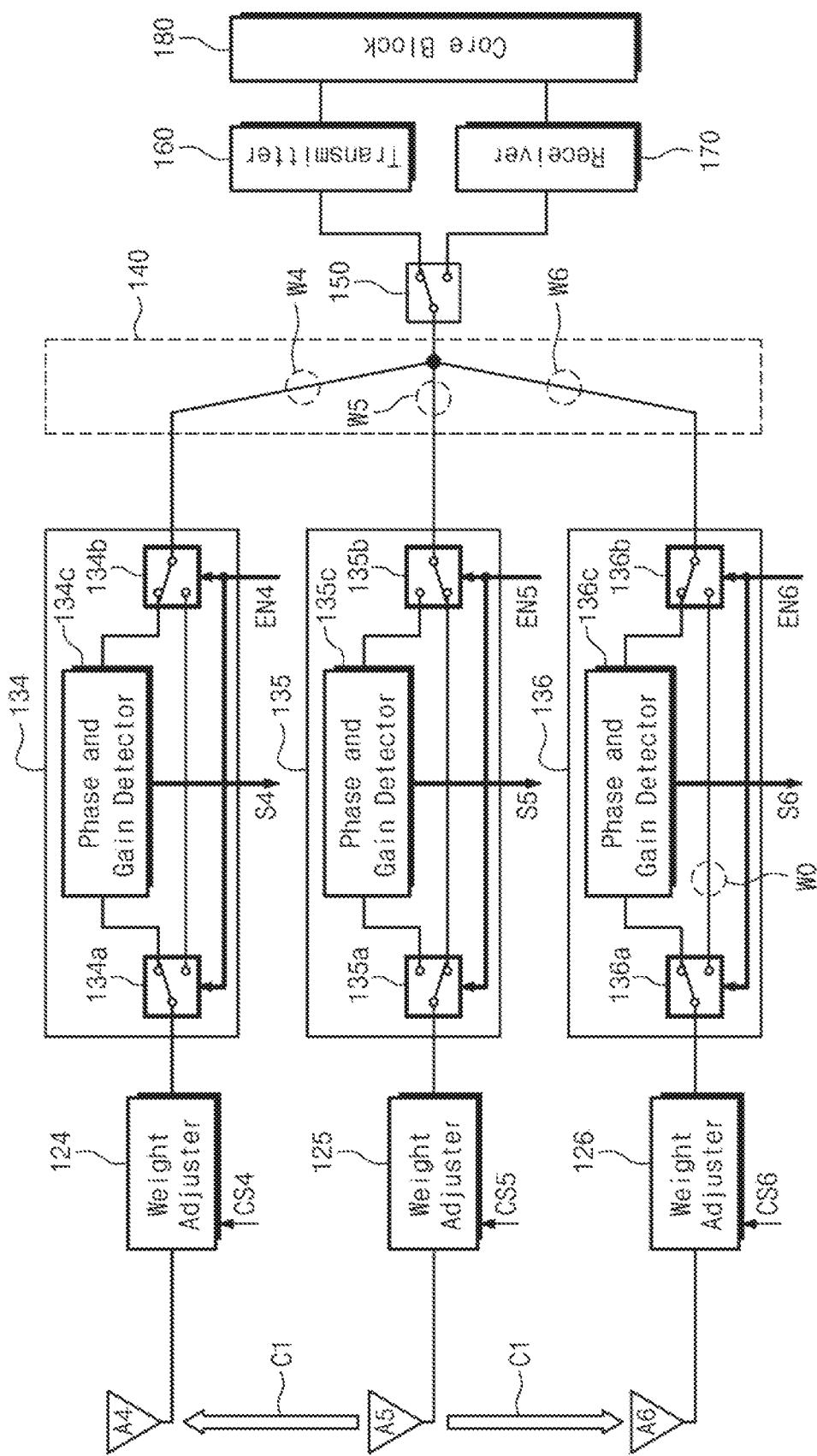
FIG. 11 illustrates an example of transmitting a signal from an intermediate antenna for compensation in association with fourth to sixth antennas.

FIG. 11 illustrates an example of transmitting a signal from an intermediate antenna for compensation in association with fourth to sixth antennas. As an example, as described with reference to FIGS. 7 and 8, it will be assumed that the fourth weight adjuster 124 and the fifth weight adjuster 125 of the fourth antenna A4 and the fifth antenna A5 have compensated weights. The fourth antenna may be a reference antenna, the sixth antenna A6 may be a target antenna, and the fifth antenna A5 may be an intermediate antenna.

Referring to FIGS. 1 and 11, the compensator 190 may control a fifth signal transmitting and detecting unit 135 of the fifth antenna A5, which is an intermediate antenna, in a first mode, a sixth signal transmitting and detecting unit 136 of the sixth antenna A6, which is a target antenna, in a second mode, and a fourth signal transmitting and detecting unit 134 of the fourth antenna A4, which is a reference antenna, in a second mode.

As described with reference to Equation (2) and Equation (9), a twelfth signal SI12, transmitted from the transmitter 160 to a phase and gain detector 136c of a sixth signal transmitting and detecting unit 136 through the fifth antenna A5 and the sixth antenna A6, may be defined by Equation (23).

$$S/12 =$$
$$1 \cdot W5e^{W5} \cdot W0e^{W0} \cdot C1e^{C1} = W5 \cdot W0 \cdot C1e^{W5+W0+C1}$$

Equation (23)

As described with reference to Equation (3) and Equation (10), a thirteenth signal SI13, transmitted from the transmitter 160 to the phase and gain detector 136c through the switch 150 and the second switch 136b of the sixth signal transmitting and detecting unit 136, may be defined by Equation (24).

$$S/13 = 1 \cdot W6e^{W6} = W6e^{W6}$$

Equation (24)

A phase and gain detector 135c of a sixth signal transmitting and detecting unit 136 may output a ratio of the twelfth signal SI12 and the thirteenth signal SI13 as a sixth output signal S6. The sixth output signal S6 is defined by Equation (25).

$$S6 = \frac{S/13}{S/12} = \frac{W6}{W5 \cdot W0 \cdot C1} e^{W6-W5-W0-C1}$$

Equation (25)

As described with reference to Equation (2) and Equation (9), a signal, transmitted from the transmitter 160 to the phase and gain detector 134c of the fourth signal transmitting and detecting unit 134 through the fifth antenna A5 and the fourth antenna A4, may be the twelfth signal SI12 of Equation (23).

As described with reference to Equation (3) and Equation (10), a signal, transmitted from the transmitter 160 to the phase and gain detector 134c through the switch 150 and the second switch 134b of the fourth signal transmitting and detecting unit 134, may be defined by Equation (26).

$$S/14 = 1 \cdot W4e^{W4} = W4e^{W4}$$

Equation (26)

The phase and gain detector 134c of the fourth signal transmitting and detecting unit 134 may output a ratio of the twelfth signal SI12 and the fourteenth signal SI14 as a fourth output signal S4. The fourth output signal S4 is defined by Equation (27).

$$S4 = \frac{S/14}{S/12} = \frac{W4}{W5 \cdot W0 \cdot C1} e^{W4-W5-W0-C1} \quad \text{Equation (27)}$$

The compensator 190 may calculate a ratio of the fourth output signal S4 and the sixth output signal S6. For example, the fourth output signal S4 of Equation (27) indicating an influence of the fourth antenna A4, which is a reference antenna, on the fifth antenna A5, which is an intermediate antenna, may be divided by the sixth output signal S6 of Equation (25) indicating an influence of the sixth antenna A6, which is a target antenna, on the fifth antenna a5 which is an intermediate antenna. A result of the division may be a compensation coefficient COMP2, and may be expressed as Equation (28).

$$COMP2 = \frac{\frac{W4}{W5 \cdot W0 \cdot C1} e^{W4-W5-W0-C1}}{\frac{W6}{W5 \cdot W0 \cdot C1} e^{W6-W5-W0-C1}} = \frac{W4}{W6} e^{W4-W6} \quad \text{Equation (28)}$$

Referring to Equation (28), the compensation coefficient COMP2 shows a difference between a weight of the sixth antenna A6, which is a target antenna, and a weight of the fourth antenna A4 which is a reference antenna and shows, in detail, an amplitude ratio (that is, gain) and a phase difference. The compensator 190 may adjust a weight of the sixth weight adjuster 126 of the sixth antenna A6, which is the target antenna, according to the compensation coefficient COMP2. When the compensation is completed, amplitudes of signals may become equal to each other and phases thereof may be aligned at the fourth antenna A4 and the sixth antenna A6.

Target antennas may sequentially selected at the first to ninth antennas A1 to A9, and the compensation described with reference to FIGS. 10 and 11 may be performed. Accordingly, amplitudes of the signals communicating at the first to ninth antennas A1 to A9 may become equal to each other, and phases thereof may be all aligned in the same manner.

As described above, the wireless transmitting and receiving device 100 according to an example embodiment may internally and automatically align amplitudes and phases of signals communicating at antennas. Thus, the manufacturing cost of the wireless transmitting and receiving apparatus 100 is reduced, and accuracy thereof is improved.

Figure 12:
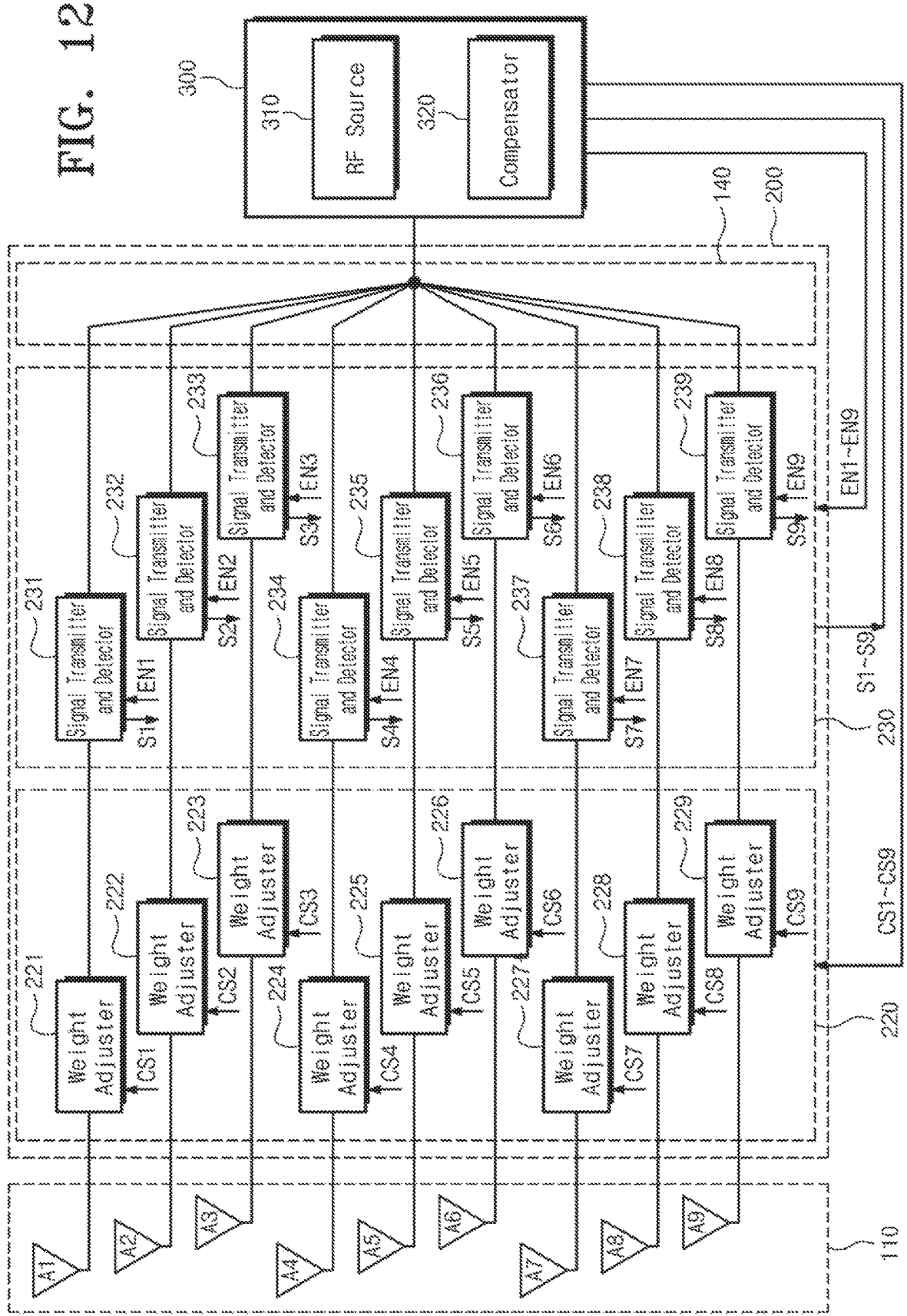
FIG. 12 is a block diagram of a beamformer according to an example embodiment of the present disclosure.

FIG. 12 is a block diagram of a beamformer 200 according to an example embodiment of the present disclosure. Referring to FIG. 12, a beamformer 200 according to an example embodiment may include a weight block 220, a detection block 230, and a power distribution block 240.

The weight block 220 includes first to ninth weight adjusters 221 to 229. The weight block 220 may be configured to be connected (or coupled) to external antennas through antenna nodes. The first to ninth weight adjusters 221 to 229 may be configured and operate the same as the first to ninth weight adjusters 121 to 129 in FIG. 1, except that they communicate with the external antennas A1 to A9 through antenna nodes rather than the first to ninth antennas A1 to A9. Accordingly, duplicate explanations will be omitted.

The detection block 230 includes first to ninth signal transmitting and detecting units 231 to 239. The first to ninth signal transmitting and detecting units 231 to 239 may be configured and operate the same as the first to ninth signal transmitting and detecting units 131 to 139 in FIG. 1. Accordingly, duplicate explanations will be omitted.

The power distribution block 240 may be configured to be connected (or coupled) to an external device through a wireless signal node. The power distribution block 240 may be configured and operates the same as the power distribution block 140 in FIG. 1, except that it communicates with an external device through a wireless signal node rather than the switch 150. Accordingly, duplicate explanations will be omitted.

After the beamformer 200 is manufactured, a compensation operation may be performed to compensate for differences in amplitude and phase between signals transmitted by the beamformer 200. For the compensation operation, the beamformer 200 may be connected a compensation device 300. The compensation device 300 may include a radio-frequency (RF) source 310, a compensator 320, and an antenna block for compensation.

Similarly to the antenna block 110 described with reference to FIG. 1, the compensation antenna block 330 may include first to ninth antennas A1 to A9. The first to ninth antennas A1 to A9 may be connected (or coupled) to antenna nodes of the weight block 220, respectively.

The RF source 310 may be connected (or coupled) to a wireless signal node of the power distribution block 240. The RF source 310 may transmit a wireless signal to the power distribution block 240 at an appropriate timing under the control of the compensator 320. Similarly to the descriptions made with reference to FIGS. 1 to 11, the compensator 320 may adjust weights of first to ninth weight adjusters 221 to 229 using first to ninth mode signals EN1 to EN9, first to ninth output signals S1 to S9, and control signals CS1 to CS9.

After the weights are adjusted to compensate for the differences in amplitude and phase, a compensation device 300 may be disconnected from the beamformer 200. The beamformer 200 may be distributed or used as a product in which there is no difference in amplitude and phase.

As an example, the beamformer 200 may be coupled to the antenna block 110 to constitute a directivity phased-array antenna device. Weights of the directivity phased-array antenna device may be compensated by the RF source 310 and the compensator 320. Then, the directivity phased-array antenna device may be distributed or used as a product in which there is no difference in amplitude and phase.

As described above, components of the wireless transmitting and receiving device 100 have been described using terms such as first, second, third, and the like. However, the terms such as first, second, third, and the like are used to distinguish the components from each other, and do not limit the present disclosure. For example, the terms such as first, second, third, and the like do not imply numeral meanings of order or any form.

In the above-described embodiments, components according to embodiments are referred to by using blocks. The blocks may be implemented with various hardware devices, such as an integrated circuit, an application specific IC (ASIC), a field programmable gate array (FPGA), and a complex programmable logic device (CPLD), software, such as firmware and applications driven in hardware devices, or a combination of a hardware device and software. In addition, the blocks may include circuits or IP (Intellectual Property) including semiconductor elements in an integrated circuit (IC).

As described above, a wireless transmitting and receiving device, internally aligning phases of signals, and an operating method of the wireless transmitting and receiving device are provided. Thus, time required to align phases of signals may be reduced, and the phases of the signals may be adaptively realigned depending on variation of environment.

Although the present disclosure and its advantages have been described in detail, it should be understood that various changes, substitutions and alterations can be made herein without departing from the spirit and scope of the disclosure as defined by the following claims.

What is claimed is:

1. A wireless transmitting and receiving device comprising:
   antennas;
   weight adjusters connected to the antennas, respectively, and configured to apply weights to an amplitude and a phase of a signal communicating through the antennas;
   signal transmitting and detecting units connected to the weight adjusters, respectively;
   a transmitter and a receiver connected to a first switch;
   a power distributor configured to connect the first switch to the respective signal transmitting and detecting units through internal wirings; and
   a compensator configured to adjust the weights of the weight adjusters respectively according to output signals of the signal transmitting and detecting units,
   wherein each of the signal transmitting and detecting units is configured to connect a corresponding weight adjuster and a corresponding wiring of the power distributor to each other in a first mode and to output a ratio of a first signal, transmitted from the corresponding weight adjuster, and a second signal, transmitted from the corresponding wiring of the power distributor, as one of the output signals in a second mode.

2. The wireless transmitting and receiving device as set forth in claim 1, wherein the compensator is configured to control each of the signal transmitting and detecting units in one of the first and second modes.

3. The wireless transmitting and receiving device as set forth in claim 1, wherein each of the signal transmitting and detecting units comprises:
   a second switch connected to the corresponding weight adjuster;
   a third switch connected to the corresponding wiring of the power distributor; and
   a phase and gain detector configured to output a ratio of an amplitude and/or a phase difference of a signal, transmitted from the second switch, and a signal, transmitted from the third switch, as the one of the output signals,
   in the first mode, the second switch connects the corresponding weight adjuster to the third switch and the third switch connects the corresponding wiring of the power distributor to the second switch, and
   in the second mode, the second switch connects the corresponding weight adjuster to the phase and gain detector and the third switch connects the corresponding wiring of the power distributor to the phase and gain detector.

4. The wireless transmitting and receiving device as set forth in claim 1, wherein the compensator is configured to detect signals, transmitted from reference antennas to neighboring antennas among the antennas, to adjust weights associated with the reference antenna.

5. The wireless transmitting and receiving device as set forth in claim 4, wherein the antennas are arranged in a matrix of rows and columns,
   the reference antennas are disposed closest in a same row or a same column among the antennas, and
   the neighboring antennas are disposed closest to the reference antennas in adjacent row of the same row or an adjacent column of the same column.

6. The wireless transmitting and receiving device as set forth in claim 1, wherein the compensator controls a first phase and gain detector, associated with a first reference antenna among the antennas, in the first mode and;
   wherein the compensator controls a second phase and gain detector, associated with a first neighboring antenna adjacent to the first reference antenna, and a third phase and gain detector, associated with a second neighboring antenna adjacent to the first reference antenna, in the second mode.

7. The wireless transmitting and receiving device as set forth in claim 6, wherein the compensator deactivates phase and gain detectors corresponding to remaining antennas except for the first reference antenna, the first neighboring antenna, and the second neighboring antenna among the antennas.

8. The wireless transmitting and receiving device as set forth in claim 7, wherein when the transmitter transmits a third signal through the first switch, the compensator obtains a first output signal from the second phase and gain detector and a second output signal from the third phase and gain detector.

9. The wireless transmitting and receiving device as set forth in claim 8, wherein after obtaining the first output signal and the second output signal, the compensator controls a fourth phase and gain detector, associated with a second reference antenna among the antennas, in the first mode and;
   wherein the compensator controls the second phase and gain detector and the third phase and gain detector in the second mode.

10. The wireless transmitting and receiving device as set forth in claim 9, wherein when the transmitter transmits a fourth signal through the first switch, the compensator obtains a third output signal from the second phase and gain detector and a fourth output signal from the third phase and gain detector.

11. The wireless transmitting and receiving device as set forth in claim 10, wherein the compensator adjusts a weight, associated with one of the first and second reference antennas, depending on a result value obtained by multiplying a ratio of the first output signal and the second output signal by a ratio of the third output signal and the fourth output signal.

12. The wireless transmitting and receiving device as set forth in claim 1, wherein the compensator is configured to detect signals, transmitted through a target antenna, a reference antenna, and an intermediate antenna between the target antenna and the reference antenna, from among the antenna, and to adjust a weight associated with the target antenna.

13. The wireless transmitting and receiving device as set forth in claim 12, wherein the compensator controls a first phase and gain detector, associated with the target antenna, in the first mode and controls a second phase and gain detector, associated with the intermediate antenna, in the second mode, and when the transmitter transmits a third signal through the first switch, the compensator obtains a first output signal of the second phase and gain detector.

14. The wireless transmitting and receiving device as set forth in claim 13, wherein after obtaining the first output signal, the compensator controls a third phase and gain detector, associated with the reference antenna, in the first mode and controls a second phase and gain detector, associated with the intermediate antenna, in the second mode, and when the transmitter transmits a fourth signal through the first switch, the compensator obtains a second output signal of the second phase and gain detector.

15. The wireless transmitting and receiving device as set forth in claim 14, wherein the compensator adjusts a weight, associated with the target antenna, based on a ratio of the first output signal and the second output signal.

16. The wireless transmitting and receiving device as set forth in claim 12, wherein the compensator controls a first phase and gain detector, associated with the intermediate antenna, in the first mode and controls a second phase and gain detector, associated with the target antenna, and a third phase and gain detector, associated with the reference antenna, in the second mode, and when the transmitter transmits a third signal through the first switch, the compensator obtains a first output signal of the second phase and gain detector and a second output signal of the third phase and gain detector.

\* \* \* \* \*